US 9,007,036 B2

(12) United States Patent
Tisserand et al.

(10) Patent No.: US 9,007,036 B2
(45) Date of Patent: Apr. 14, 2015

(54) ROTARY ELECTRICAL MACHINE WITH EXCITATION PROVIDED WITH A DIGITAL REGULATOR DEVICE (75) Inventors: Pierre Tisserand, Limeil Brevannes (FR); Pierre Chassard, Creteil (FR); Laurent Labiste, Saint Maur des Fosses (FR)

(73) Assignee: Valeo Equipments Electriques Moteur, Créteil Cedex (FR)

( * ) Notice: Subject to any disclaimer, the term of this patent is extended or adjusted under 35 U.S.C. 154(b) by 431 days.

(21) Appl. No.: 13/505,411

(22) PCT Filed: Oct. 28, 2010

(86) PCT No.: PCT/FR2010/052310
§ 371 (c)(1),
(2), (4) Date: Aug. 14, 2012

(87) PCT Pub. No.: WO2011/058259
PCT Pub. Date: May 19, 2011

(65) Prior Publication Data
US 2012/0326677 A1 Dec. 27, 2012

(30) Foreign Application Priority Data
Nov. 13, 2009 (FR) .................................... 09 58031

(51) Int. Cl.
H02P 9/00 (2006.01)
H02J 7/24 (2006.01)
H02P 9/24 (2006.01)
H02P 9/48 (2006.01)

(52) U.S. Cl.
CPC . *H02J 7/245* (2013.01); *H02P 9/24* (2013.01); *H02P 9/48* (2013.01); *Y02T 10/92* (2013.01)

(58) Field of Classification Search
USPC ..................................... 322/28, 24, 20, 44, 22
See application file for complete search history.

(56) References Cited

U.S. PATENT DOCUMENTS 5,315,229 A * 5/1994 Markus ........................... 322/28
5,671,112 A * 9/1997 Hu et al. .......................... 361/86
5,689,175 A * 11/1997 Hanson et al. .................. 322/28

(Continued)

FOREIGN PATENT DOCUMENTS

FR 2 909 237 5/2008
JP 2000 217399 8/2000

*Primary Examiner* — Julio Gonzalez
*Assistant Examiner* — Viet Nguyen
(74) *Attorney, Agent, or Firm* — Berenato & White, LLC (57) ABSTRACT The rotary electrical machine is capable of functioning as a generator and outputs a continuous output voltage (Ub+) that is adjustable by an excitation current. The digital regulator (2) of the machine comprises an excitation current control means (7) and a control loop (6) that includes a device (10) for measurement, by sampling, of the output voltage (Ub+), the measurement device generating a signal sampled at a predetermined first sampling frequency (F1 e). The machine has a bandwidth that is limited by a predetermined first cutoff frequency (F1 c). The measurement device includes an apparatus for oversampling such that the first sampling frequency (F1 e) is greater than twice the first cutoff frequency (F1 c), and the control loop also includes an apparatus (12) for decimating the sampled signal.

17 Claims, 4 Drawing Sheets

(56) References Cited

U.S. PATENT DOCUMENTS

| | | | |
|---|---|---|---|
| 6,198,256 B1* | 3/2001 | Miyazaki et al. | 322/16 |
| 6,486,638 B1* | 11/2002 | Sumimoto et al. | 322/28 |
| 7,948,420 B1* | 5/2011 | Brahma et al. | 341/155 |
| 2005/0218815 A1 | 10/2005 | Kobayashi et al. | |
| 2007/0112443 A1* | 5/2007 | Latham et al. | 700/29 |
| 2007/0176579 A1* | 8/2007 | O'Gorman et al. | 322/28 |
| 2007/0210763 A1* | 9/2007 | Aoyama | 322/28 |
| 2008/0116858 A1* | 5/2008 | Steiner | 322/25 |

* cited by examiner

ROTARY ELECTRICAL MACHINE WITH EXCITATION PROVIDED WITH A DIGITAL REGULATOR DEVICE

CROSS-REFERENCE TO RELATED APPLICATIONS AND CLAIM TO PRIORITY

This application is a national stage application of International Application No, PCT/FR2010/052310 filed Oct. 28, 2010, which claims priority to French Patent application Ser. No. 09/58031 filed Nov. 13, 2009, of which the disclosures are incorporated herein by reference and to which priority is claimed.

TECHNICAL FIELD OF THE INVENTION

The present invention relates to a rotary electrical machine with excitation which can operate as a generator, and is provided with a regulator device of a digital type.

TECHNOLOGICAL BACKGROUND OF THE INVENTION

In the motor vehicle field, a rotary electrical machine with excitation is known which is used as an alternator or alternator-starter, and comprises a rotary inductor which is provided with an excitation coil and a stator with a plurality of windings.

When the machine is operating as an alternator and the inductor is rotating, the stator windings provide alternating voltages which are rectified in order to obtain a direct voltage. This direct voltage is regulated such as to provide the on-board electrical supply network of the vehicle with a constant direct voltage for charging of the battery and supply to the consumers which are connected to the network.

The output voltage of the alternator is regulated conventionally by adjusting the excitation current which circulates in the inductor coil.

For a constant speed of rotation and charge, the response of the alternator to a variation of the excitation current is limited by the intrinsic pass-band of the system, which depends on the electromechanical characteristics of the alternator.

For motor vehicle applications, the output voltage must be regulated such as to remain constant in operating ranges (ranges of speed of rotation and electrical charge represented by the battery and the consumers) which are defined by the vehicle manufacturers.

For this purpose, in a motor vehicle alternator, the output voltage is measured and compared continually with a set value by a regulator device which controls the excitation current such as to minimise or eliminate the error between the output voltage measured and the set value.

The company VALEO EQUIPEMENTS ELECTRIQUES MOTEUR has already proposed to carry out this regulation on the basis of measurements by sampling, by means of digital techniques which provide substantial advantages in comparison with the conventional analogue methods, and in particular in its European patents EP 0 481 862 and EP 0 802 606.

However, implementation of the digital processing algorithms on microcontrollers does not make it possible to modify easily the gain and/or the pass-band and/or the stability and/or the reference input of the regulator loop.

In addition, these algorithms must carry out calculations on a large number of bits, which leads to the use of analogue-digital converters which have a high resolution and are consequently costly.

Finally, the diversity of the algorithms, which are adapted to each particular application, does not permit standardisation which would make their intellectual property rights easier to protect.

Consequently, there is a need for a rotary electrical machine with excitation, provided with a digital regulator which eliminates the disadvantages of the digital regulators known in the prior art.

GENERAL DESCRIPTION OF THE INVENTION

The present invention aims to satisfy this need, and its object is specifically a rotary electrical machine with excitation provided with a digital regulator device of the type which can operate as a generator, and provides a direct output voltage which is adjusted by an excitation current.

In a known manner, this type of machine has a pass-band which is limited by a first frequency with a predetermined cut-off.

The digital regulator device of this type of machine conventionally comprises means for controlling the excitation current and a regulator loop.

Also in a known manner the regulator loop comprises at its input means for measurement by sampling of the output voltage, generating a sampled signal at a first predetermined sampling frequency, and at its output means for generation of a control signal, these control means being controlled according to the sampled signal and a set value.

The rotary electrical machine with excitation according to the invention is distinguished in that the means for measurement comprise oversampling means such that the first sampling frequency is more than twice the first cut-off frequency, and in that the regulator loop additionally comprises means for decimation of the sampled signal.

The means for measurement generate the sampled signal on a first predetermined number of bits, and, highly advantageously, the regulator loop additionally comprises means for filtering the sampled signal, such that the said sampled signal comprises, after processing by these means, a second predetermined number of bits which is greater than the first number of bits. Preferably, the filtering means comprise a filter of the averaging type which produces a sliding average on a predetermined number of samples of the sampled signal.

Preferably, the means for decimation implement a change of frequency, such that the sampled signal has a second sampling frequency which is lower than the first sampling frequency.

According to a first embodiment of the invention, the control signal is a rectangular signal which has a variable cyclical ratio, and the means for generation comprise a digital comparator which generates the control signal by comparison of the sampled signal with a reference signal which is obtained by the addition of the set value to a counting signal which is provided by a countdown counter on a third number of bits which operate at a first clock frequency predetermined or obtained by means of a look-up table which is entered for example in a memory of the ROM or EEPROM type.

According to other embodiments of the invention, the counting signal is provided by a reversible counter which operates at a second clock frequency predetermined or obtained by means of a look-up table.

Highly advantageously, the regulator loop for the rotary electric machine with excitation according to the invention additionally comprises an analogue low-pass filter which precedes the means for measurement, and has a third cut-off frequency contained between the first cut-off frequency and half of the first sampling frequency.

Preferably, this regulator loop also comprises a voltage divider which precedes the means for measurement, with a predetermined attenuation ratio which is designed for an operating range of these means for measurement.

Advantage is derived from the fact that the regulator loop additionally comprises a communication protocol decoder which decodes a control signal, with a data bus making it possible to establish the set value, and a configuration bus making it possible to establish at least one parameter from amongst the following, on the basis of the decoded control signal:

the second cut-off frequency;
the third cut-off frequency;
the first clock frequency;
the second clock frequency;
the first sampling frequency;
the second sampling frequency;
the attenuation ratio.

The few above-described specifications will have made apparent to persons skilled in the art the advantages which are provided by the invention in comparison with the prior state of the art.

The detailed specifications of the invention are given in the following description which is provided in association with the attached drawings. It should be noted that these drawings simply serve the purpose of illustrating the text of the description, and do not constitute in any way a limitation of the scope of the invention.

DESCRIPTION OF THE PREFERRED EMBODIMENTS OF THE INVENTION

Figure 1:
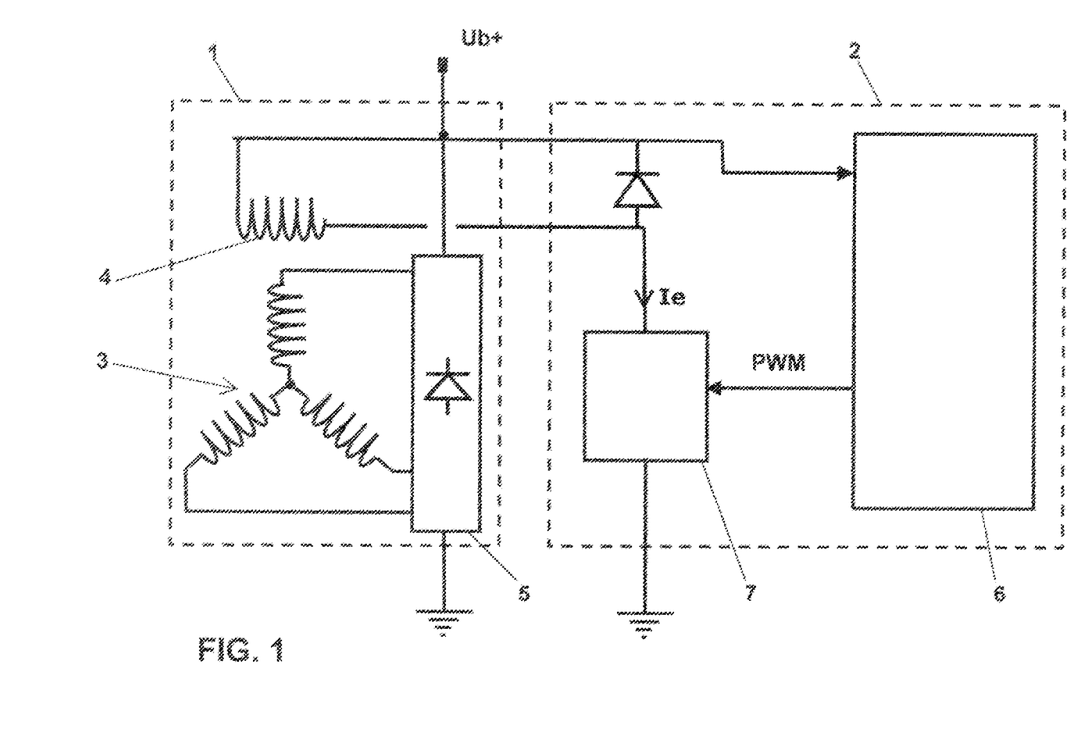
FIG. 1 is a schematic representation of a rotary electrical machine with excitation provided with a digital regulator device known according to the prior art.

The rotary electrical machine with excitation which is represented schematically in FIG. 1 is, by way of non-limiting example, a three-phase alternator 1 provided with a digital regulator device 2.

The stator 3 of the alternator 1 comprises three windings which are subjected to the rotary field created by the inductor 4 through which an excitation current Ie passes.

Alternating voltages which are generated by the windings of the stator are rectified by a rectifier unit 5 which provides as output a direct output voltage Ub+ which supplies the on-board network of the vehicle.

The output voltage Ub+ of the alternator 1 is maintained constant when the charge and speed of rotation are varied by means of a regulator loop 6 which acts on control means 7 of the excitation current Ie on the basis of measurements by sampling of this output voltage Ub+.

The control means 7 for the excitation current Ie generally includes power transistors which operate with switching and are controlled by a rectangular variable cyclical ratio signal PWM.

Figure 2:
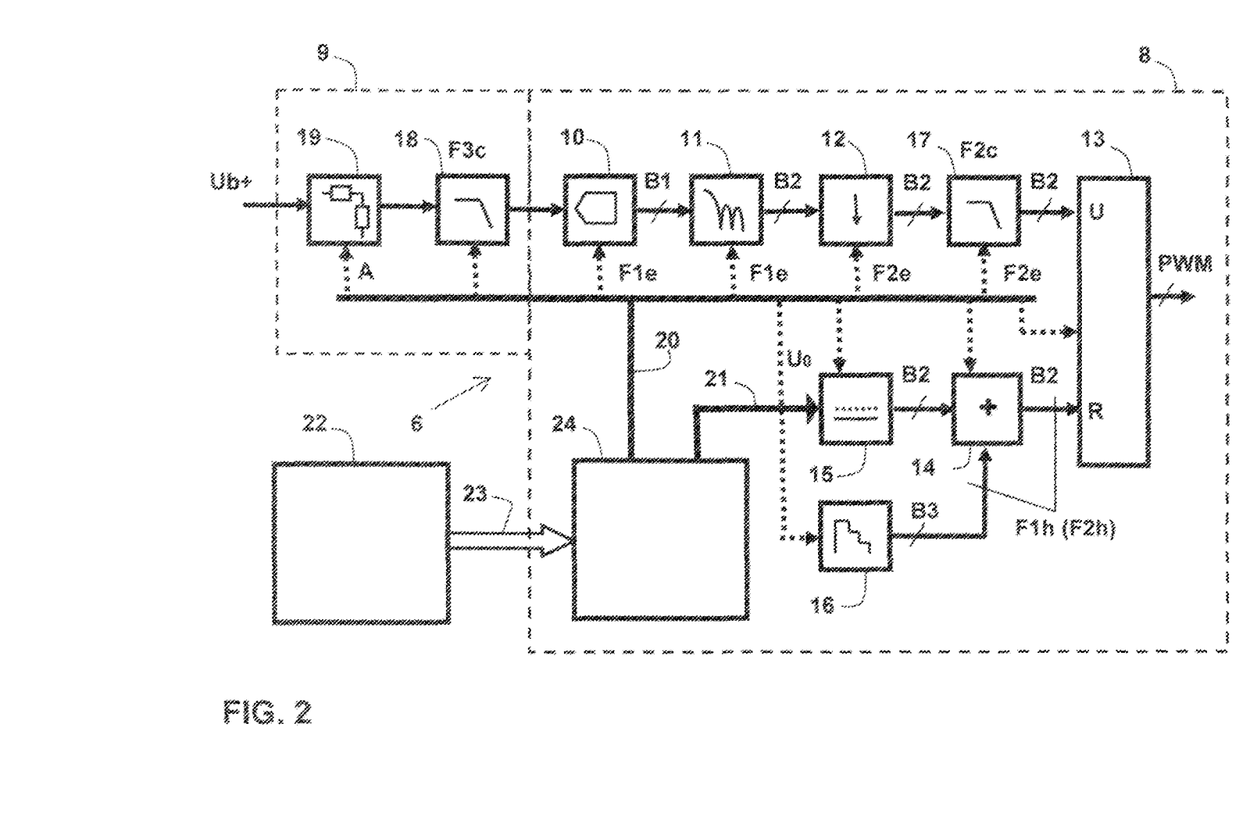
FIG. 2 is a skeleton diagram of the regulator loop of the digital regulator device with which the rotary electrical machine with excitation according to the invention is provided.

In the rotary electrical machine with excitation according to the invention, the regulator loop 6, the skeleton diagram of which is represented in FIG. 2, preferably uses in its digital part 8 one or a plurality of ASICs (Application Specific Integrated Circuits) in which there are wired different reusable proprietary signal processing modules developed in VHDL (IP VHDL, which is the acronym for Intellectual Properties Very High Speed Development Language).

An analogue part 9 of the regulator loop 6 adapts the dynamics and the pass-band of the output voltage Ub+ of the alternator 1 to the input characteristics of the analogue-digital converter 10 which provides a sampled signal at a first sampling frequency F1e, preferably of 64 KHz.

This ADC 10 is a cheap standard circuit with low resolution in a first number of bits B1, and preferably 10 bits.

The signal to noise ratio SNR at the output of the converter 10 is equal to:

$$SNR = 6.02 B1 + 1.76 \text{ dB}.$$

For the number of bits B1=10 bits of the converter 10, the ratio of signal to noise SNR is therefore only 61.96 dB.

According to the invention, the use of a analogue/digital converter with low resolution (in this case 10 bits) is however made possible, whilst maintaining a sufficient ENOB (an acronym for Effective Number of Bits) in the regulator loop 6, by using an over-sampling technique associated with the use of filtering means, for example a filter of the averaging type 11, and means 12 for decimation.

In fact, the first sampling frequency F1e (in this case 64 KHz) is more than twice a first cut-off frequency F1c which limits the pass-band of the alternator system 1 (in this case typically approximately 20 Hz).

This technique makes it possible to obtain more samples than those which are strictly necessary to reproduce the signal according to the Nyquist criterion.

The effective number of bits in the loop 6 is increased by the filter 11 of the averaging type, provided that the frequency of the samples is decreased by decimation 12. The use of a filter of the averaging type is the solution which has been selected in this embodiment of the invention in order to increase the effective number of bits in the loop 6. It will be noted however that other filters known to persons skilled in the art can also be used to obtain this result.

In the preferred embodiments of the invention, the characteristics of the filter 11 of the averaging type are preferably:

sliding average on N=32 encoded samples on B1=10 bits at the frequency F1e=64 KHz, in other words the transfer function of the filter is:

$$Y_n = (X_n + X_{n-1} + X_{n-2} + X_{n-3} + \ldots + X_{n-31})$$

the pass-band is 885 Hz at −3 dB;
the rejection frequencies are 2 kHz, 4 kHz, 6 kHz, 8 kHz, etc.;
the filter phase is of the linear type, and there is a constant delay of 250 µs;
the second number of bits B2 of the signal sampled at the output is equal to B2=15 (the samples have a dynamic of $2^{10} \times 32 = 2^{15}$).

The means 12 for decimation according to the filter of the averaging type 11 implement a change of frequency of the data flow of the regulator loop 6. The sampled signal which is input at the first sampling frequency F1e has a second sampling frequency F2e after decimation.

Since the improvement in dB obtained on the SNR is equal to 10*log(F1e/F2e) and the intrinsic number of bits of the converter 10 is B1, the decimation leads in this embodiment to an ENOB of:

ENOB=B1+(10 log(F1e/F2e))/6 i.e. ENOB=10+(10 log(64000/8000))/6=11.5 bits.

The sampling signal U obtained from the means 12 for decimation is compared with a reference signal R by a digital comparator 13.

Figure 3A:
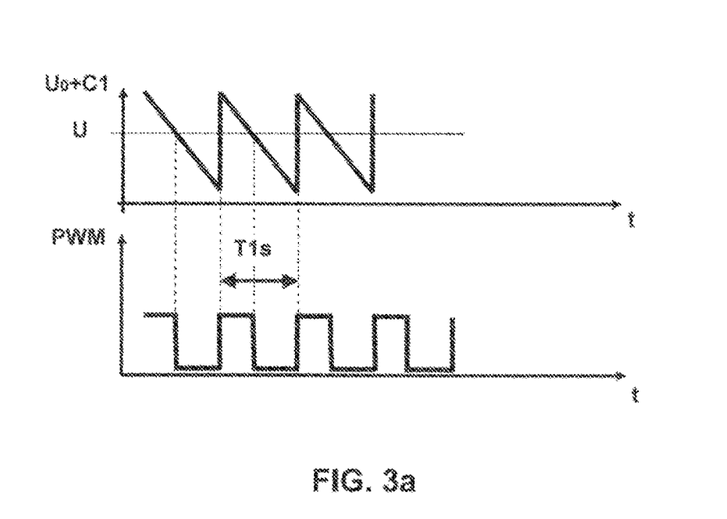
FIGS. 3a and 3b show the formation of the timing diagrams of the excitation control signal, on the basis of the timing diagrams of the counting signal in the first and second preferred embodiments of the invention respectively.

According to a first, preferred embodiment of the invention, the reference signal R is obtained by the addition in an addition circuit 14 of a set value $U_o$ contained in a register 15 which determines the output voltage Ub+ to be maintained of the alternator 1, and a counting signal C1 of a periodically reinitialised countdown counter 16, the timing diagram of which is shown in FIG. 3a.

According to another embodiment, the counting signal C1 can be obtained by means of a look-up table which for example is entered in a memory of the ROM or EEPROM type.

The countdown counter 16 operates on a third number of bits N3 at a first predetermined clock frequency F1h, and consequently a first period T1s of the saw-teeth is equal to $2^{N3}/F1h$.

In the case when, preferably, the third number of bits N3 of the countdown counter 16 is 8, and, preferably, the first clock frequency F1h is 64 KHz, the first period T1s of the saw-teeth is 4 ms, corresponding to a first operating frequency F1s of 250 Hz.

In this embodiment, the comparator 13 leads to an effective number of bits in the loop of:

ENOB=B1+(10 log(F1e/Fs))/6 i.e. ENOB=10+(10 log(64000/250))/6=14 bits.

In a second preferred embodiment of the invention, the counting signal C2 is supplied by a reversible counter instead of a countdown counter 16. In another embodiment, the counting signal C2 can be obtained by means of a look-up table which is entered for example in a memory of the ROM or EEPROM type.

Figure 3B:
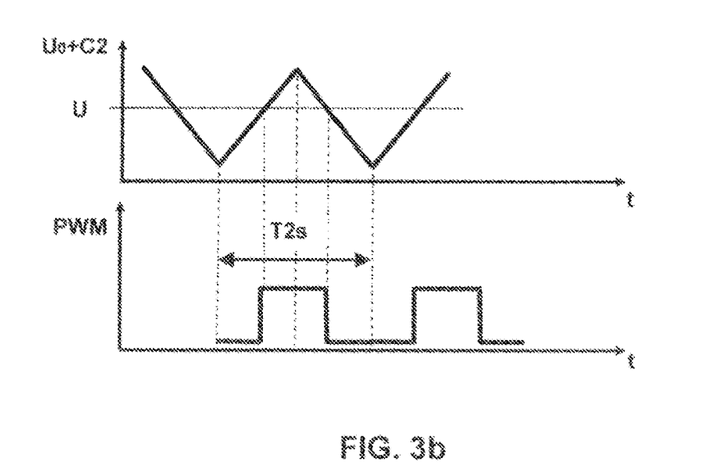

The symmetrical counting signal C2 obtained is shown in FIG. 3b. In this case, the saw-teeth have a second period T2s equal to $2^{N3+1}/F2h$, where F2h is a second clock frequency, corresponding to a second operating frequency F2s=F2h/$2^{N3+1}$. In order to obtain a second operating period T2s also of 4 ms, the second clock period F2h is therefore 128 KHz.

As shown clearly in FIGS. 3a and 3b, the comparison of the sampled signal U with the reference signal R produces a rectangular signal PWR with a variable cyclical ratio at the first or second operating frequency F1s, F2s.

This rectangular signal controls the intensity of the excitation current of the alternator 1 in a known manner, as shown in FIG. 1.

It can be considered that the comparator 13 carries out sampling at the first or second operating frequency F1s, F2s of the flow of information obtained from the means 12 for decimation.

In order to avoid the phenomenon of fallback, it is therefore necessary to place upstream from the comparator 13 a digital low-pass filter 17 which limits the band that passes beyond half the Nyquist frequency, i.e. half of the first or second operating frequency F1s, F2s of the comparator 13.

A second cut-off frequency F2c of this digital low-pass filter 17 is therefore contained between the first cut-off frequency F1c which limits the pass-band of the alternator 1 and the value F1s/2 or F2s/2 which limits the pass-band of the comparator 13.

In a known manner, the transfer function of a filter of this type is:

$$FT(u) = \frac{a}{1 - (1-a)z(u)^{-1}}$$

leading to the recurrence equation:

$$Y_n = a\left(X_n + \frac{1}{a}Y_{n-1} - Y_{n-1}\right)$$

It is important to have a fourth number of bits B4 which is large enough to decrease the effects of truncation of calculation, and thus to limit the systematic error of the regulator loop 6.

Figure 4:
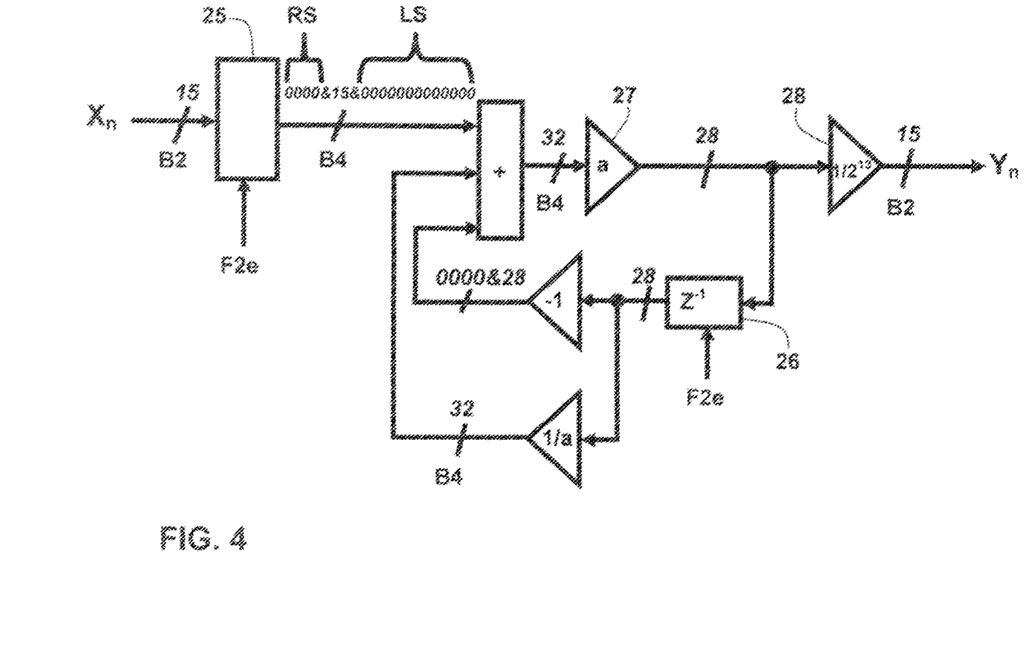
FIG. 4 is a skeleton diagram of the digital low-pass filter included in the regulator loop of digital regulator device with which the rotary electrical machine with excitation according to the invention is provided.

FIG. 4 shows schematically an embodiment of a digital low-pass filter which has a pass-band limited to 84 Hz, corresponding to the characteristics required by the alternator 1 and to those of the comparator 13 previously given by way of example, and wherein the calculations are carried out on a fourth number of bits B4 equal to 32. In this example the coefficient 1/a is 16.

The samples $X_n$ output from the means 12 for decimation encoded on the second number of bits B2 are loaded in a first lock 25 at the second sampling frequency F2e before being divided by 1/a (offsetting to the right RS by 4 bits) and multiplied by 8192 (offsetting to the left LS by 13 bits) such as to obtain the fourth number of bits B4.

The recurrence equation is implemented by means of a second lock 26. The encoding of the samples at the output $Y_n$ on the second number of bits B2 is obtained by truncation of 4 bits (multiplication 27 by a), followed by truncation of 13 bits (multiplication 28 by 1/8192).

This digital low-pass filter 17 also has the effect of decreasing the jitter on the control signal PWM of the excitation current Ie.

FIG. 2 shows that the analogue part 9 of the regulator loop 6 also comprises an analogue low-pass filter 18 which is situated downstream from the analogue-digital converter 10.

This analogue filter 18 has the appropriate characteristics in order to:
 implement anti-fallback for the ADC 10;
 permit a pass-band which is large enough in relation to the pass-band of the alternator system 1;
 carry out a first averaging in order not to saturate the ADC;
 not eliminate totally the loop noise for the ADC in order to gain ½ the LSB (LSB is the acronym for Least Significant Bit) on the ADC by dither effect.

Preferably, this analogue filter 18 is a passive filter of the 1$^{st}$ order which has a third cutoff frequency F3c, in the embodiment concerned, of 1 KHz.

In order to adjust the loop gain of the regulator 2, the analogue part 9 additionally comprises a voltage divider 19 with a predetermined attenuation ratio A.

This voltage divider 19 also makes it possible to adapt the dynamics of the output voltage Ub+ of the alternator 1 to the operating range of the ADC 10 downstream.

Preferably, the attenuation ratio A of this voltage divider 19 is 1/8. In the embodiment considered, where the analogue-digital converter 10 has an input range of 3.3 V, this attenuation makes it possible to detect and measure excess voltages of up to 26 V on the on-board network.

All or some of the different elements 10, 11, 12, 13, 14, 15, 16, 17, 18, 19 of the regulator loop 6, whether they are analogue or digital, are programmable and interfaced with a configuration bus 20 and a data bus 21, as shown in FIG. 2.

Means 22 for control of the system are used for the configuration of these different elements 10, 11, 12, 13, 14, 15, 16, 17, 18, 19 via a communication protocol 23 (for example the protocols LIN, CAN, FlexRay, series or parallel, etc.). This protocol 23 uses all the electronic transmission safety systems of the type such as redundancy, or verification of the data transmitted by checksum (this is a concept of the theory of codes used for the corrector codes) or cyclic redundancy check (mechanism for control of cohesion of information, using cyclical or algorithm codes) in order to increase the robustness of the transmission and coherence of the information transmitted.

These system control means 22 are either a computer or an engine control device or another device which has a logic or hardware interface which permits access to the different elements 10, 11, 12, 13, 14, 15, 16, 17, 18, 19 of the regulator loop 6 via the protocol 23.

An electronic device 24 which specialises in decoding of the protocol 23 permits the configuration of the different elements 10, 11, 12, 13, 14, 15, 16, 17, 18, 19 of the regulator loop 6 via the configuration bus 20, by transmitting the configuration emitted by the means 22 for control of the system, in order to adapt the regulator loop 6, as well as its associated electronic functions (for example LRC, progressive charging, states machine, alarms, thresholds of the different measurements) to the requirements.

In particular, the characteristics of the regulator 2, such as the gain, and/or the pass-band and/or the stability, and/or the level of regulation, can easily be programmed by setting to appropriate values the parameters of the different elements 10, 11, 12, 13, 14, 15, 16, 17, 18, 19 of the regulator loop 6, i.e.:

the second cut-off frequency F2C of the digital low-pass filter 17;
the third cut-off frequency of the analogue low-pass filter 18;
the first clock frequency F1$h$ of the countdown counter 16;
the second clock frequency of F2$h$ of the reversible counter;
the first sampling frequency F1$e$ of the analogue-digital converter 10 and of the filter of the averaging type 11;
the second sampling frequency F2$e$ of the means 12 for decimation and of the digital low-pass filter 17;
the attenuation ratio A of the voltage divider 19.

A minimal configuration is used by default in the event of breakdown of the protocol 23 or incoherence of the data received by the means 22 for control of the system, in order to make the regulator 2 safe (operating in downgraded mode).

Automatic calibration of the gain of the digital part 8 of the regulator loop 6 is carried out either during production, or at each start-up, or during the operation by dynamic reconfiguration, for example.

The implementation of the regulator loop 6 of the regulator device 2 by different elements 10, 11, 12, 13, 14, 15, 16, 17, 18, 19 in the form of one or a plurality of ASICs developed in VHDL, or any other language which makes possible the digital synthesis, thus provides great flexibility for production of a rotary electrical machine with excitation with predetermined global performance levels.

The density of integration on silicon which is made possible by the digital system also has the advantage of decreasing the intrinsic processing currents.

The techniques of oversampling and decimation implemented by the invention make it possible to increase the effective number of bits (ENOB) on the basis of sampling on a small number of bits.

It is thus possible to use an analogue-digital converter with low resolution which is standard and/or inexpensive, thus providing the rotary electrical machine with excitation according to the invention with a competitive advantage.

It will be appreciated that the preceding description would apply in similar terms to models of rotary electrical machines with excitation other than the three-phase alternator represented in FIG. 1.

The digital values indicated correspond to experimental developments obtained by the applicant company, and are given purely by way of examples.

A rotary electrical machine 1 provided with a regulator device 2 comprising an ADC 10 with a resolution other than 10 bits, and which uses frequencies of cut-offs F1$c$, F2$c$, F3$c$, sampling F1$e$, F2$e$ and clock F1$h$, F2$h$ other than those specified, could have been described in the same manner.

The invention thus incorporates all the possible variant embodiments which would remain within the context defined by the following claims.

The invention claimed is:

1. A rotary electrical machine with excitation (1) provided with a digital regulator device (2), said rotary electrical machine adapted to operate as a generator and supply an output voltage (Ub+) adjusted by an excitation current (Ie), and having a pass-band limited by a first predetermined cut-off frequency (F1$c$), said digital regulator device (2) comprising:
control means (7) for control of the said excitation current (Ie); and
a regulator loop (6) comprising input means (10) for measurement by sampling of said output voltage (Ub+) which generates a sampled signal at a first predetermined sampling frequency (F1$e$), and output means (13) for generation of a control signal (PWM) which controls said control means (7) according to said sampled signal and a set value (Uo), wherein said input means (10) for measurement comprise oversampling means such that said first sampling frequency (F1$e$) is more than twice said first cut-off frequency (F1$c$), and wherein said regulator loop (6) additionally comprises means (12) for decimation of said sampled signal.

2. The rotary electrical machine with excitation (1) according to claim 1, wherein said means (10) for measurement generates said sampled signal on a first predetermined number of bits (B1), and wherein said regulator loop (6) further comprises means (11) for filtering said sampled signal, such that said sampled signal comprises, after processing by said means (11), a second predetermined number of bits (B2) which is greater than said first number of bits (B1).

3. The rotary electrical machine with excitation (1) according to claim 2, wherein said filtering means comprise a filter of the averaging type (11) which produces a sliding average on a predetermined number of samples (N) of said sampled signal.

4. The rotary electrical machine with excitation (1) according to claim 3, wherein said control signal (PWM) is a rectangular signal which has a variable cyclical ratio, and wherein said means for generation comprise a digital comparator (13) which generates said control signal (PWM) by comparison of said sampled signal (U) with a reference signal (R) which is obtained by the addition of said set value (Uo) to a counting signal (C1) which is provided by a countdown counter, or a look-up table, on a third number of bits (B3) which operate at a first predetermined clock frequency (F1h).

5. The rotary electrical machine with excitation (1) according to claim 2, wherein said means (12) for decimation implement a change of frequency, such that said sampled signal has a second sampling frequency (F2e) which is lower than said first sampling frequency (F1e).

6. The rotary electrical machine with excitation (1) according to claim 4, wherein said control signal (PWM) is a rectangular signal which has a variable cyclical ratio, and said means for generation comprise a digital comparator (13) which generates said control signal (PWM) by comparison of said sampled signal (U) with a reference signal (R) which is obtained by the addition of said set value (Uo) to a counting signal (C2) which is provided by a reversible counter, or a look-up table, on a third number of bits (B3) which operate at a second predetermined clock frequency (F2h).

7. The rotary electrical machine with excitation (1) according to claim 1, wherein said regulator loop (6) additionally comprises an analogue low-pass filter (18) which precedes said means (10) for measurement, and has a third cut-off frequency (F3c) contained between said first cut-off frequency (F1c) and half of said first sampling frequency (F1e).

8. The rotary electrical machine with excitation (1) according to claim 1, wherein said regulator loop (6) also comprises a voltage divider (19) which precedes said means (10) for measurement, with a predetermined attenuation ratio (A) which is designed for an operating range of said means (10) for measurement.

9. The rotary electrical machine with excitation (1) according to claim 1, wherein said regulator loop (6) additionally comprises a communication protocol decoder (24) which decodes a control signal (23), with a data bus (21) to establish said set value (Uo), and a configuration bus (20) to establish at least one parameter from amongst the following, on the basis of said decoded control signal (23):
a second cut-off frequency (F2c);
a third cut-off frequency (F3c);
a first clock frequency (F1h);
a second clock frequency (F2h);
said first sampling frequency (F1e);
a second sampling frequency (F2e);
an attenuation ratio (A).

10. The rotary electrical machine with excitation (1) according to claim 1, wherein:
said first cut-off frequency (F1c) is substantially equal to 20 Hz;
a second cut-off frequency (F2c) is substantially equal to 84 Hz;
a third cut-off frequency (F3c) is substantially equal to 1 kHz;
a first clock frequency (F1h) is equal to 64 KHz;
a second clock frequency (F2h) is equal to 128 KHz;
said first sampling frequency (F1e) is equal to 64 KHz;
a second sampling frequency (F2e) is equal to 8 KHz;
a first number of bits (B1) is 10;
a second number of bits (B2) is 15;
a third number of bits (B3) is 8;
a fourth number of bits (B4) is 32;
an attenuation ratio (A) is 1/8.

11. The rotary electrical machine with excitation (1) according to claim 1, wherein said regulator loop (6) additionally comprises a digital low-pass filter (17) which precedes said output means (13) of said regulator loop (6) and has a second cut-off frequency (F2c) contained between said first cut-off frequency (F1c) and half of a first operating frequency (F1s) or between said first cut-off frequency (F1c) and half of a second operating frequency (F2s).

12. The rotary electrical machine with excitation (1) according to claim 11, wherein said regulator loop (6) additionally comprises an analogue low-pass filter (18) which precedes said means (10) for measurement and has a third cut-off frequency (F3c) contained between said first cut-off frequency (F1c) and half of said first sampling frequency (F1e).

13. A digital regulator device (2) for a rotary electrical machine with excitation (1), the rotary electrical machine having a pass-band limited by a first predetermined cut-off frequency (F1c) and operable as a generator for supplying an output voltage (Ub+) adjusted by an excitation current (Ie), said digital regulator device (2) comprising:
control means (7) for control of the said excitation current (Ie); and
a regulator loop (6) comprising input means (10) for measurement by sampling of said output voltage (Ub+) which generates a sampled signal at a first predetermined sampling frequency (F1e), means (12) for decimation of said sampled signal and output means (13) for generation of a control signal (PWM) which controls said control means (7) according to said sampled signal and a set value (Uo), wherein said input means (10) for measurement comprise oversampling means such that said first sampling frequency (F1e) is more than twice said first cut-off frequency (F1c).

14. A regulator loop (6) for a rotary electrical machine adapted to operate as a generator and supply an output voltage (Ub+) adjusted by an excitation current (Ie), said regulator loop (6) comprising:
input means (10) for measurement by sampling of said output voltage (Ub+) which generates a sampled signal at a first predetermined sampling frequency (F1e); and
output means (13) for generation of a control signal (PWM) which controls control means (7) for controlling of the said excitation current (Ie) according to said sampled signal and a set value (Uo); and
means (12) for decimation of said sampled signal;
said input means (10) comprising oversampling means such that said first sampling frequency (F1e) is more than twice said first cut-off frequency (F1c).

15. The regulator loop (6) according to claim 14, further comprises means (11) for filtering said sampled signal, such that said sampled signal comprises, after processing by said means (11), a second predetermined number of bits (B2) which is greater than said first number of bits (B1).

16. The regulator loop (6) according to claim 15, wherein said filtering means comprise a filter of the averaging type (11) which produces a sliding average on a predetermined number of samples (N) of said sampled signal.

17. The regulator loop (6) according to claim 15, wherein said means (12) for decimation implement a change of frequency, such that said sampled signal has a second sampling frequency (F2e) which is lower than said first sampling frequency (F1e).

* * * * *